United States Patent
Pedrick et al.

(10) Patent No.: US 11,841,336 B2
(45) Date of Patent: Dec. 12, 2023

(54) BUBBLE DETECTION SENSOR

(71) Applicant: MEASUREMENT SPECIALTIES, INC., Hampton, VA (US)

(72) Inventors: Michael Pedrick, Hampton, VA (US); Achilles Rubiano, Hampton, VA (US); Jodi Matzeder, Hampton, VA (US)

(73) Assignee: TE CONNECTIVITY SOLUTIONS GMBH, Schaffhausen (CH)

( * ) Notice: Subject to any disclaimer, the term of this patent is extended or adjusted under 35 U.S.C. 154(b) by 192 days.

(21) Appl. No.: 17/150,672

(22) Filed: Jan. 15, 2021

(65) Prior Publication Data
US 2022/0229000 A1    Jul. 21, 2022

(51) Int. Cl.
G01N 27/00    (2006.01)

(52) U.S. Cl.
CPC .................. G01N 27/00 (2013.01)

(58) Field of Classification Search
CPC .... G01N 27/00; G01N 29/032; A61B 8/4477; A61B 17/3203; A01D 43/063; H02M 3/33571; H01L 28/10; G16H 40/63; C02F 1/4608; B41J 2/04555
See application file for complete search history.

(56) References Cited

U.S. PATENT DOCUMENTS

| | | | | |
|---|---|---|---|---|
| 5,500,657 A | * | 3/1996 | Yauchi | B41J 2/04555 347/92 |
| 2009/0025355 A1 | * | 1/2009 | Hibi | A01D 43/063 56/199 |
| 2009/0293588 A1 | * | 12/2009 | Riley | G01N 29/032 73/19.03 |
| 2011/0213396 A1 | * | 9/2011 | Tabata | A61B 17/3203 606/167 |
| 2014/0014516 A1 | * | 1/2014 | Kumagai | C02F 1/4608 204/554 |
| 2017/0028140 A1 | * | 2/2017 | Toshima | G16H 40/63 |
| 2018/0110913 A1 | * | 4/2018 | Loderer | A61B 8/4477 |

(Continued)

FOREIGN PATENT DOCUMENTS

| | | | | |
|---|---|---|---|---|
| CN | 101250801 A1 | * | 8/2008 | ............. D06F 58/50 |
| CN | 102473938 A | * | 5/2012 | ............. H01M 8/0432 |

(Continued)

OTHER PUBLICATIONS

Conrad, Keven and Lynnworth, Larry, "Fundamentals of Ultrasonic Flow Meters", Panametrics, Inc., American School of Gas Measurement Technology, pp. 52-61, copyright 2002, Version dated May 2, 2002.

*Primary Examiner* — Michael J Dalbo
*Assistant Examiner* — Kaleria Knox (57) ABSTRACT

A bubble detection sensor includes an emitter having an emitting surface and a receiver positioned on a side of a fluid conduit opposite the emitter. The receiver has a receiving surface adapted to receive a signal emitted by the emitter through a fluid of the fluid conduit. A sensor axis extending normal to the emitting surface and the receiving surface is disposed at a rotation offset angle with respect to a plane extending normal to a longitudinal conduit axis of the fluid conduit. The rotation offset angle is set to optimize a ratio of a sensitivity of the signal received by the receiver to an efficiency of the signal received by the receiver.

20 Claims, 7 Drawing Sheets

(56) References Cited

U.S. PATENT DOCUMENTS

2019/0357827 A1* 11/2019 Li .................... A61B 5/1486
2019/0369536 A1* 12/2019 Mano ............... H02M 3/33571
2022/0093546 A1*  3/2022 Elsherbini ............... H01L 28/10

FOREIGN PATENT DOCUMENTS

| CN | 105092684 A | * | 11/2015 | |
|----|-------------|---|---------|---|
| CN | 109141556 A |   | 1/2019  | |
| WO | 2020120320 A1 |   | 6/2020  | |
| WO | WO-2020120320 A1 | * | 6/2020 | .......... A61M 1/3626 |

* cited by examiner

BUBBLE DETECTION SENSOR

FIELD OF THE INVENTION

The present invention relates to a sensor and, more particularly, to a bubble detection sensor for detecting bubbles in a fluid.

BACKGROUND

Bubble detection sensors used to detect bubbles in a fluid have an emitter and a receiver on opposite sides of a tube carrying the fluid. A signal is transmitted from the emitter to the receiver through the fluid and is analyzed to determine the presence or absence of bubbles in the fluid. Detecting the presence of bubbles in a fluid is critical in many applications. In the medical field, for example, bubbles in a fluid transmitted to a patient for intravenous infusion or dialysis are detected to avoid potentially dangerous air embolisms. Current applications require increased sensitivity of the bubble detection sensor for more reliable detection of smaller bubbles.

U.S. Patent Application No. 2009/0293588 discloses a bubble detection sensor including an emitter and a receiver that are offset laterally from each other. The lateral offset of the emitter and the receiver increases the sensitivity of the bubble detection sensor to allow the detection of smaller bubbles. Due to the lateral offset, however, less of the signal emitted from the emitter is received by the receiver, decreasing an efficiency of the bubble detection sensor. Increasing the efficiency of such an arrangement requires expensive additional signal amplification or better signal processing.

In fluid detection sensors generally, as disclosed for example in *Fundamentals of Ultrasonic Flow Meters* (Conrad et al.), an emitter and a receiver may be rotated to account for refraction of the signal through the fluid medium. The angle of rotation of the emitter and receiver is selected only to optimize the efficiency of the signal; ensuring as much as possible of the signal emitted by the emitter is received by the receiver as a result of the refraction. The angle of rotation does not account for the sensitivity of the signal to scatterers such as bubbles.

SUMMARY

A bubble detection sensor includes an emitter having an emitting surface and a receiver positioned on a side of a fluid conduit opposite the emitter. The receiver has a receiving surface adapted to receive a signal emitted by the emitter through a fluid of the fluid conduit. A sensor axis extending normal to the emitting surface and the receiving surface is disposed at a rotation offset angle with respect to a plane extending normal to a longitudinal conduit axis of the fluid conduit. The rotation offset angle is set to optimize a ratio of a sensitivity of the signal received by the receiver to an efficiency of the signal received by the receiver.

BRIEF DESCRIPTION OF THE DRAWINGS

The invention will now be described by way of example with reference to the accompanying Figures, of which.

DETAILED DESCRIPTION OF THE EMBODIMENTS

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Figure 1:
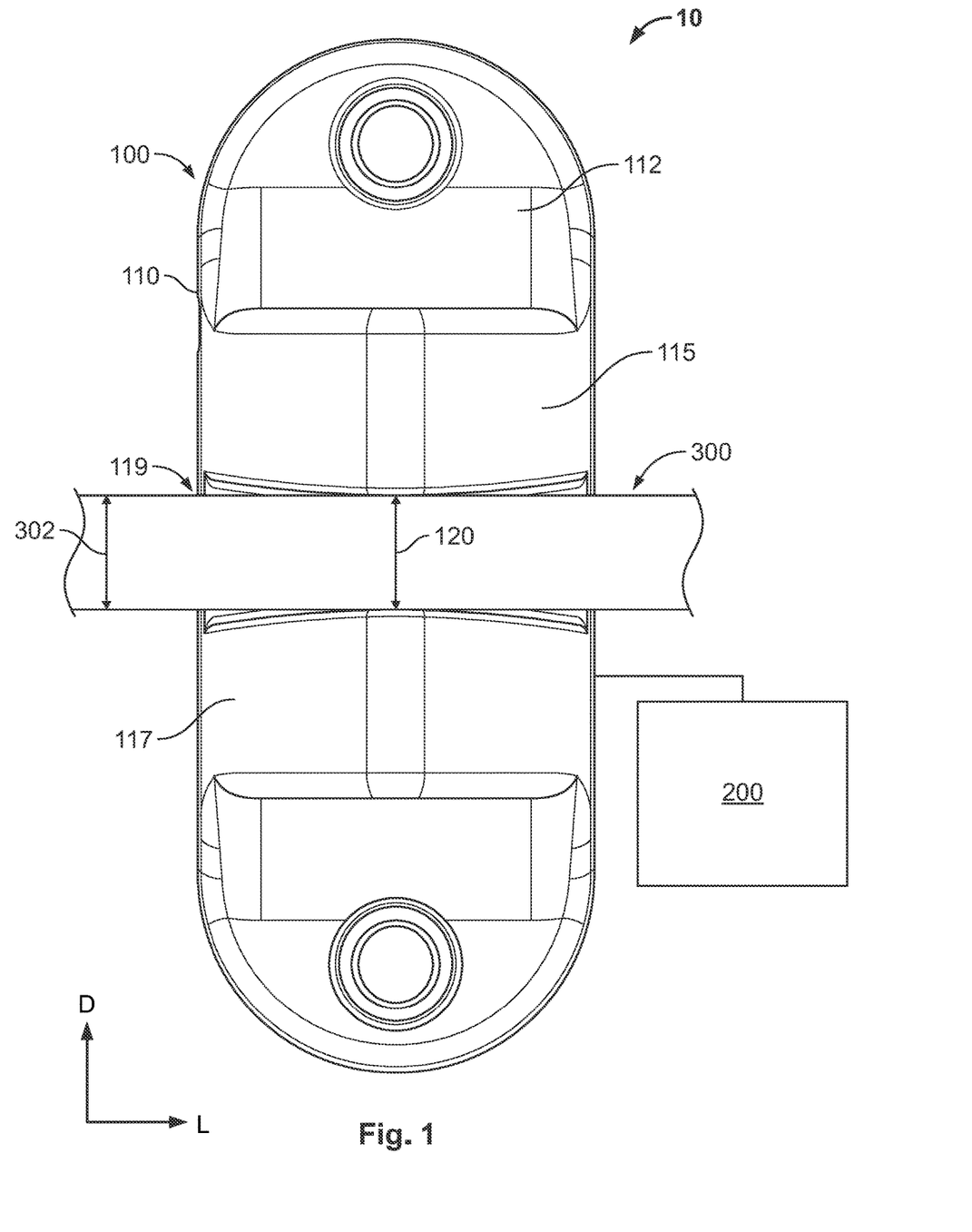
FIG. 1 is a front view of a bubble detection system according to an embodiment.
Figure 2:
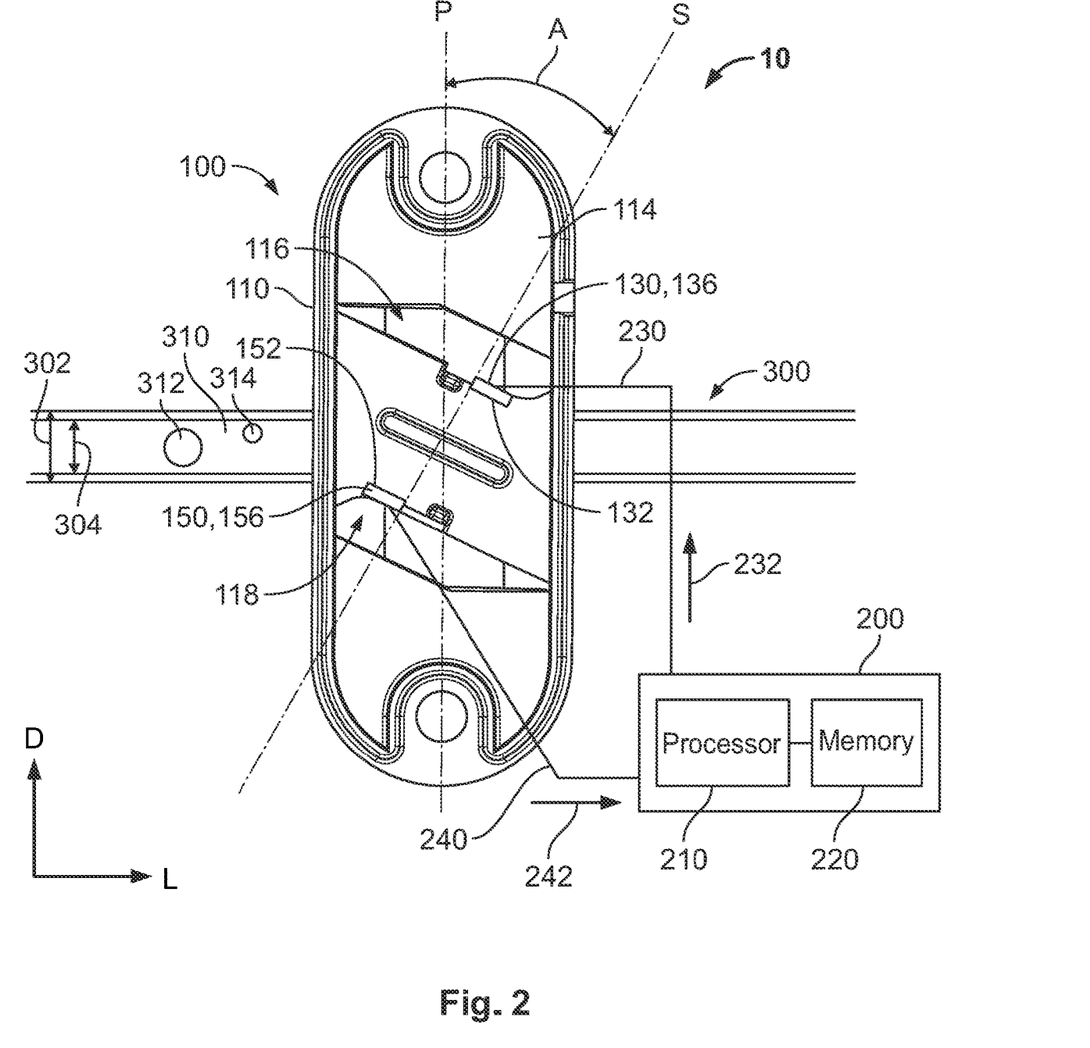
FIG. 2 is a rear view of the bubble detection system.

A bubble detection system 10 according to an embodiment, as shown in FIGS. 1 and 2, comprises a bubble detection sensor 100, a controller 200 connected to the bubble detection sensor 100, and a fluid conduit 300 disposed in the bubble detection sensor 100.

Figure 3:
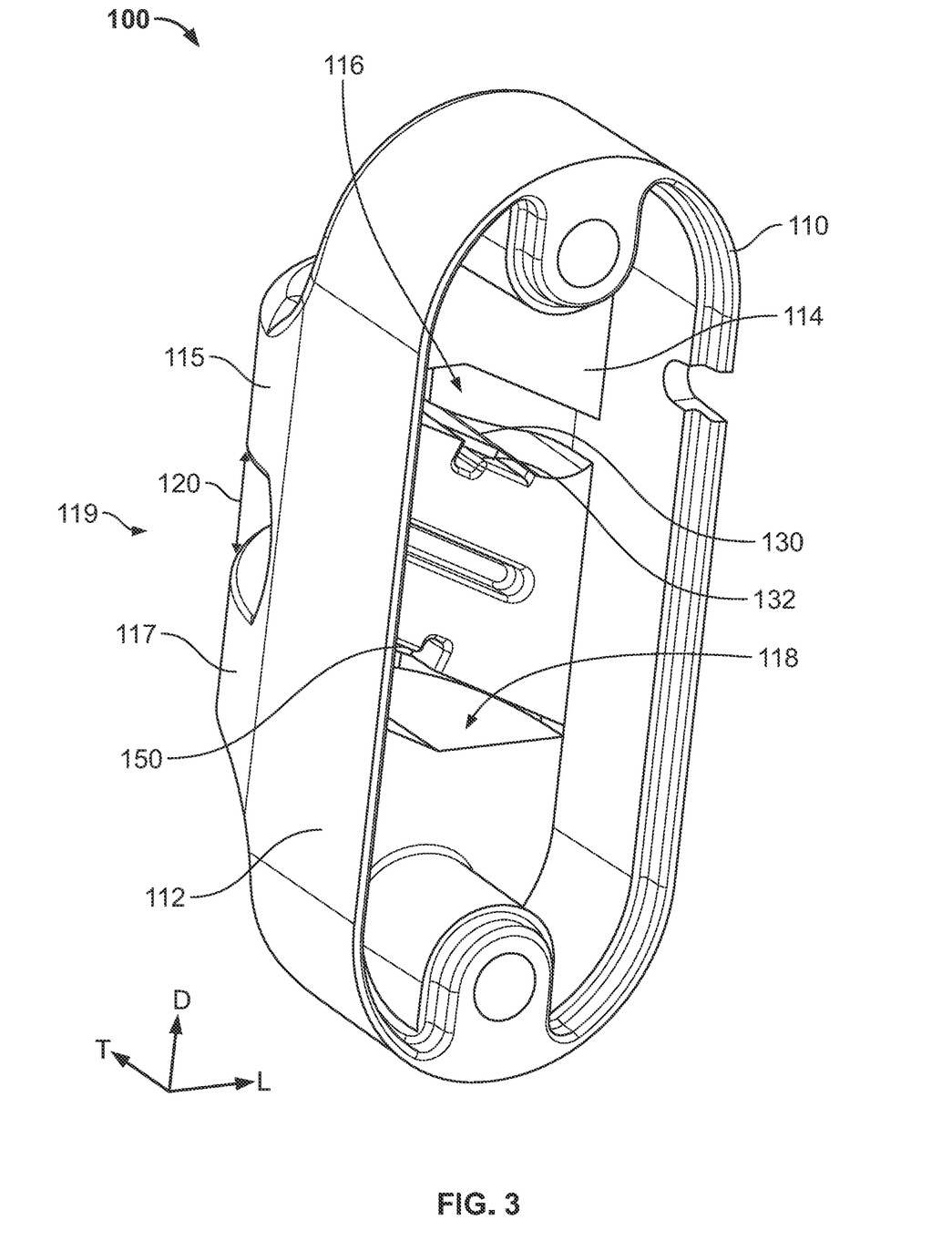
FIG. 3 is a perspective view of a bubble detection sensor of the bubble detection system.

The bubble detection sensor 100, as shown in FIGS. 1-3, includes a housing 110, an emitter 130 disposed in the housing 110, and a receiver 150 disposed in the housing 110.

The housing 110, as shown in FIGS. 1-3, has an exterior surface 112 and an interior surface 114 opposite the exterior surface 112. The housing 110 forms a first receiving section 115 and a second receiving section 117. The first receiving section 115 and the second receiving section 117 each protrude in a transverse direction T on the exterior surface 112, the first receiving section 115 forming a first receiving space 116 on the interior surface 114 and the second receiving section 117 forming a second receiving space 118 on the interior surface 114.

On the exterior surface 112, as shown in FIGS. 1 and 3, the first receiving section 115 and the second receiving section 117 are positioned parallel to one another along a longitudinal conduit axis L perpendicular to the transverse direction T. The first receiving section 115 and the second receiving section 117 are spaced apart and separated from one another on the exterior surface 112 in a depth direction D perpendicular to the transverse direction T and the longitudinal conduit axis L, defining a channel 119 formed by the exterior surface 112 between the first receiving section 115 and the second receiving section 117.

In the embodiment shown in FIGS. 1-3, the housing 110 is integrally formed in a single piece with the first receiving section 115, the second receiving section 117, and the channel 119. In other embodiments, the components of the housing 110 could be formed separately and assembled together to form the housing 10 as shown and described herein.

The emitter 130, in the embodiment shown in FIGS. 2 and 3, is a piezoelectric crystal that is capable of being electrically excited at its resonant frequency with an input voltage to produce ultrasonic sound waves. The emitter 130 is held in the first receiving space 116 of the first receiving section 115 with an emitting surface 132 of the emitter 130 facing the channel 119. The emitter 130 is held in the first receiving section 115 at a rotation offset angle A shown in FIG. 2 and described in greater detail below.

The receiver 150, in the embodiment shown in FIGS. 2 and 3, is a piezoelectric crystal that receives the ultrasonic sound waves from the emitter 130 and produces an output voltage based on the ultrasonic sound waves. The receiver 150 is held in the second receiving space 118 of the second receiving section 117 with a receiving surface 152 of the receiver 150 facing the channel 119. The receiver 150 is held in the second receiving section 117 at the rotation offset angle A shown in FIG. 2 and described in greater detail below.

Figure 5:
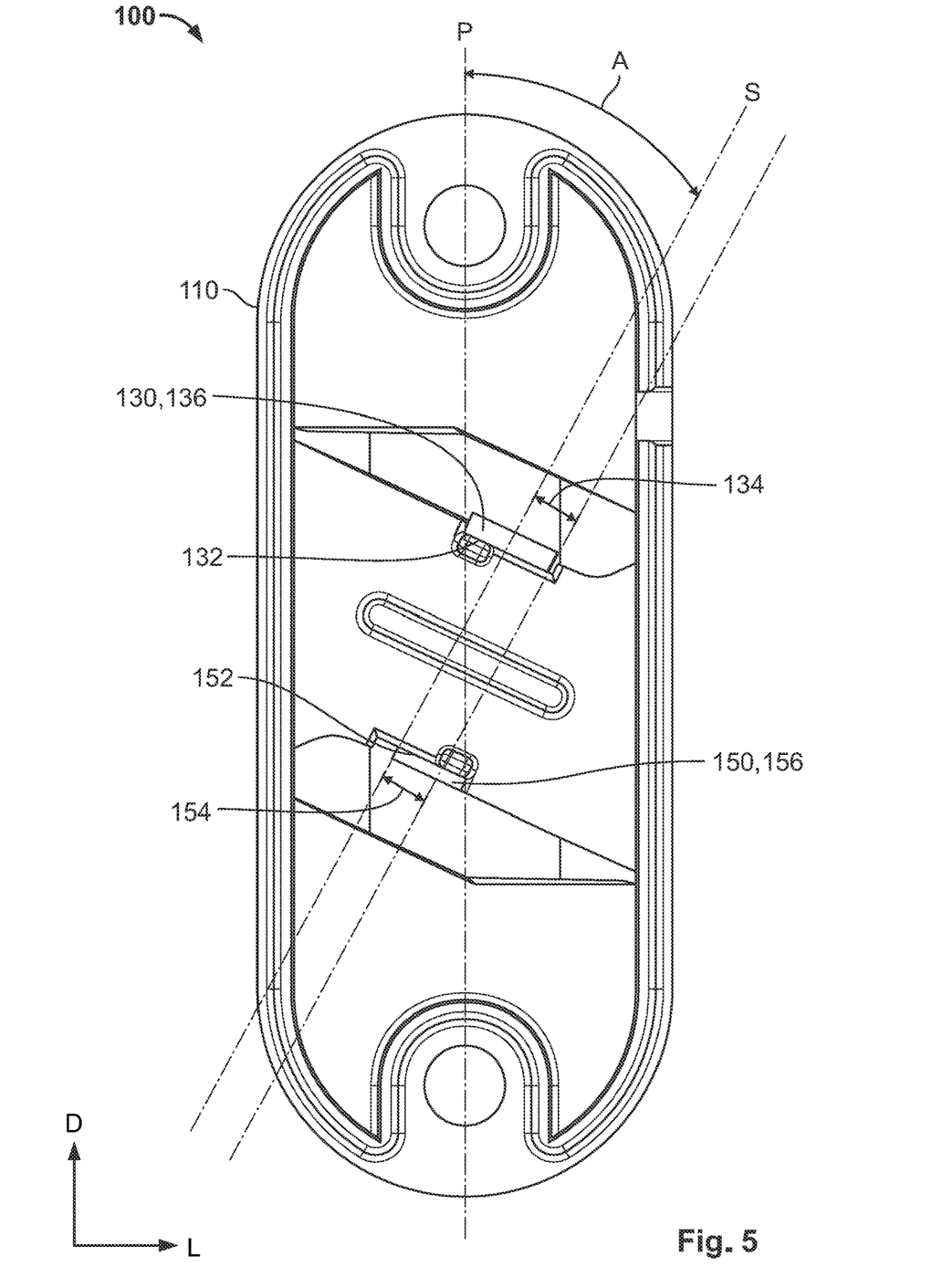
FIG. 5 is a rear view of a bubble detection sensor according to another embodiment.

As shown in FIG. 2, the emitter 130 has an emitter cross-sectional area 136 and the receiver 150 has a receiver cross-sectional area 156. In the shown embodiment, the emitter 130 and the receiver 150 each have a rectangular prism shape. In other embodiments, the emitter 130 and the receiver 150 may each have a cylindrical shape or any other type of shape capable of emitting and receiving the ultrasonic waves as described herein. In the embodiment shown in FIGS. 2 and 3, the emitter cross-sectional area 136 is equal to the receiver cross-sectional area 156. In other embodiments, as shown in FIG. 5, the emitter cross-sectional area 136 may be different from the receiver cross-sectional area 156.

The controller 200, shown in FIGS. 1 and 2, includes a processor 210 and a memory 220 connected to the processor 210. The memory 220 is a non-transitory computer readable medium capable of storing program instructions thereon that are executable by the processor 210. The processor 210 executes programs stored on the memory 220 to perform the functions of the controller 200 described herein. The controller 200 has an emitter connection line 230 connecting the controller 200 to the emitter 130 along which the controller 200, by execution of the processor 210, can transmit an input voltage 232 to the emitter 130. The controller 200 has a receiver connection line 240 connecting the controller 200 to the receiver 150 along which the controller 200, by execution of the processor 210, can receive an output voltage 242 from the receiver 150.

The fluid conduit 300, as shown in FIGS. 1 and 2, contains a fluid 310. The fluid 310 passes along the fluid conduit 300 in the longitudinal conduit axis L. In the shown embodiment, the fluid conduit 300 is a cylindrical tube with a circular cross-section. In other embodiments, the fluid conduit 300 can be any shape or type of fluid conduit 300 capable of being used with the bubble detection sensor 100 as described in detail below.

As shown in FIGS. 1 and 2, the fluid conduit 300 is disposed in the channel 119 and extends along the longitudinal conduit axis L. In an embodiment, an outer diameter 302 of the fluid conduit 300 is larger than a height 120 of the channel 119 in the depth direction D, and the fluid conduit 300 is slightly compressed between the first receiving section 115 and the second receiving section 117 to removably hold the fluid conduit 300 in the channel 119 by an interference fit. In other embodiments, the fluid conduit 300 may be removably secured in the channel 119 other than by an interference fit, and the outer diameter 302 may be less than or equal to the height 120 of the channel 119.

With the fluid conduit 300 disposed in the channel 119, as shown in FIG. 2, the emitter 130 and the receiver 150 are positioned on opposite sides of the fluid conduit 300 in the depth direction D. The emitting surface 132 faces the fluid conduit 300 in the channel 119 and the receiving surface 152 faces the fluid conduit 300 in the channel 119.

As shown in FIG. 2, the emitter 130 and the receiver 150 do not extend parallel to the fluid conduit 300 but rather are held in the respective receiving sections 115, 117 of the housing 110 at an angle with respect to the fluid conduit 300. A sensor axis S extends through the emitter 130 and the receiver 150 normal to the emitting surface 132 and the receiving surface 152. The sensor axis S is rotated with respect to a plane P extending, along the depth direction D and the transverse direction T, normal to the longitudinal conduit axis L of the fluid conduit 300 by the rotation offset angle A shown in FIG. 2. With the sensor axis S disposed at the rotation offset angle A, the emitting surface 132 is parallel to the receiving surface 152.

In the embodiment shown in FIG. 2, in addition to having the sensor axis S disposed at the rotation offset angle A with respect to the plane P, the emitter 130 and the receiver 150 are each laterally offset from the sensor axis S in a direction extending perpendicular to the sensor axis S. Due to the degree of the lateral offset shown in the embodiment of FIG. 2, the emitting surface 132 does not overlap with the receiving surface 152 in a direction extending parallel to the sensor axis S.

Figure 4:
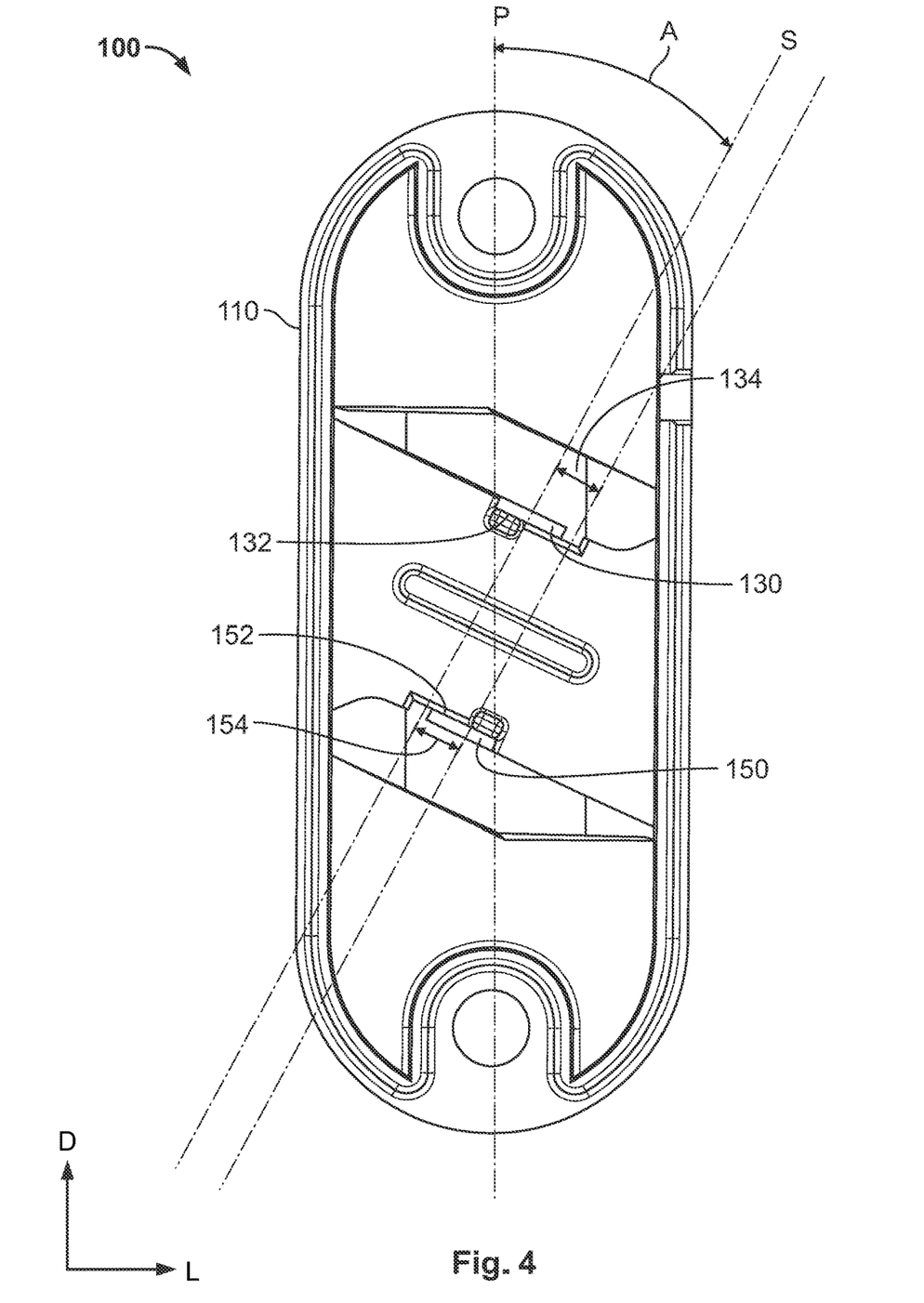
FIG. 4 is a rear view of a bubble detection sensor according to another embodiment.

In another embodiment, as shown in FIGS. 4 and 5, the sensor axis S is disposed at the rotation offset angle A with respect to the plane P, and the emitting surface 132 and the receiving surface 152 overlap with one another in a direction extending parallel to the sensor axis S. In the embodiment shown in FIGS. 4 and 5, the emitter 130 and the receiver 150 are each laterally offset from the sensor axis S in the direction extending perpendicular to the sensor axis S with an emitting overlapping portion 134 of the emitting surface 132 overlapping with a receiving overlapping portion 154 of the receiving surface 152 along a direction extending parallel to the sensor axis S.

In the embodiment shown in FIG. 2, the emitting surface 132 and the receiving surface 152 do not overlap in a direction parallel to the sensor axis S; the emitting overlapping portion 134 is 0% of the emitting surface 132 and the receiving overlapping portion 154 is 0% of the receiving surface 152. In the embodiment shown in FIGS. 4 and 5, the emitting overlapping portion 134 is approximately 50% of the emitting surface 132 and the receiving overlapping portion 154 is approximately 50% of the receiving surface 152. In other embodiments, the emitting overlapping portion 134 may be greater than 0% and less than 50% of the emitting surface 132 and the receiving overlapping portion 154 may be greater than 0% and less than 50% of the receiving surface 152.

Figure 6:
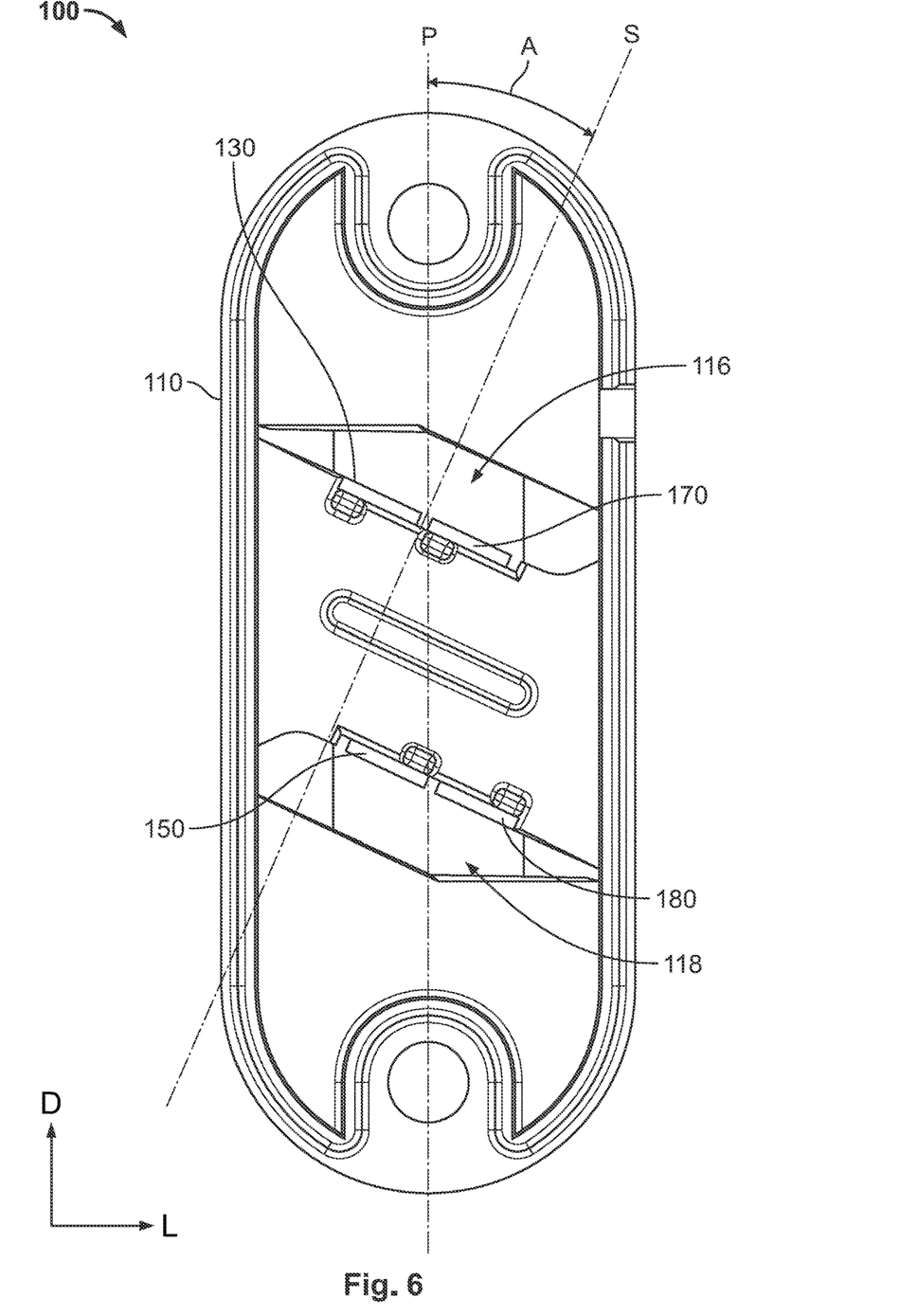
FIG. 6 is a rear view of a bubble detection sensor according to another embodiment.

In another embodiment shown in FIG. 6, the bubble detection sensor 100 has the emitter 130, the receiver 150, another emitter 170, and another receiver 180 disposed in the housing 110. The emitter 130 and the another emitter 170 are held in the first receiving space 116 of the first receiving section 115 and the receiver 150 and the another receiver 180 are held in the second receiving space 118 of the second receiving section 117. The emitter 130 and the receiver 150 are positioned with respect to each other along the sensor axis S as described in the embodiments above. The another emitter 170 is identical to the emitter 130 and the another receiver 180 is identical to the receiver 150. The another emitter 170 and the another receiver 180 are positioned along the sensor axis S at the rotation offset angle A and are positioned with respect to each other identically to the emitter 130 and the receiver 180. The emitter 130 emits ultrasonic waves received by the receiver 150 and the another emitter 170 emits ultrasonic waves received by the another receiver 180. In the embodiment shown in FIG. 6, the another emitter and the another receiver 180 provide redundancy to the transmitted signals in the bubble detection sensor 100 described herein.

The function of the bubble detection system 10 will now be described in greater detail primarily with reference to FIGS. 1, 2, 7, and 8.

As shown in FIG. 2, in use, the fluid 310 flows in the fluid conduit 300 along the longitudinal conduit axis L while the fluid conduit 300 is held in the channel 119 between the emitter 130 and the receiver 150. A number of bubbles 312, 314 can be present in the fluid 310, including, for example, a large bubble 312 and a small bubble 314. In the exemplary embodiment, the large bubble 312 is approximately 70% of an inner diameter 304 of the fluid conduit 300 and the small bubble 314 is approximately 30% of the inner diameter 304.

The bubble detection system 10 is used to detect the bubbles 312, 314 in the fluid 310. To detect the bubbles 312, 314, as shown in FIG. 2, the controller 200 outputs the input voltage 232 to the emitter 130 along the emitter connection line 230. The emitter 130 produces ultrasonic sound waves in accordance with the input voltage 232, which are emitted out from the emitting surface 132 toward the channel 119 and into the fluid 310 in the fluid conduit 300. The ultrasonic sound waves may also be referred to as a "signal" herein.

The signal is received by the receiver 150 at the receiving surface 152 after it passes through the fluid 310, and the receiver 150 outputs the output voltage 242 depending on the signal along the receiver connection line 240 back to the controller 200. The signal received by the receiver 150 is impacted by refraction through the medium of the fluid 310 and by the presence of bubbles 312, 314 in the fluid 310. The output voltage 242 is representative of the signal received by the receiver 150.

Figure 7:
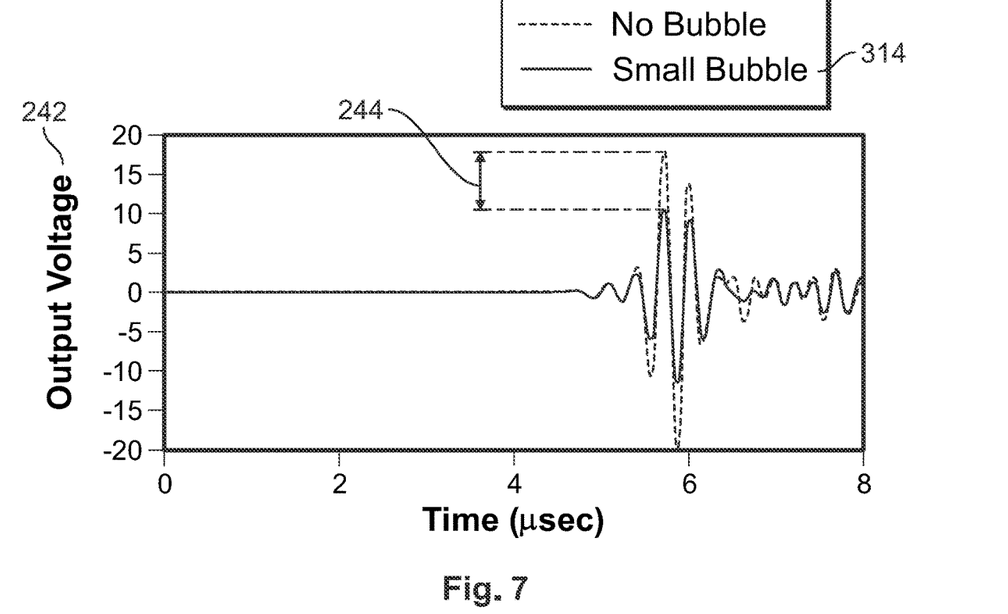
FIG. 7 is a graph of an output voltage of the bubble detection system in the presence and absence of a bubble.

The controller 200 analyzes the output voltage 242 to determine a presence or an absence of bubbles 312, 314 in the fluid 310. The controller 200 monitors the output voltage 242 and, when a drop 244 in the output voltage 242 occurs as shown in the example embodiment of FIG. 7, the controller 200 determines that a bubble 312, 314 is present in the fluid 310. The example embodiment of FIG. 7 shows the drop 244 in the output voltage 242 for a small bubble 314, but the concept of the output voltage 242 dropping to indicate a bubble 312, 314 applies equally to the small bubble 314 or any bubble 312, 314 larger than the small bubble 314.

A comparison of the output voltage 242 to the input voltage 232 by the controller 200 indicates both an efficiency of the ultrasonic wave signal received by the receiver 150 in the absence of bubbles 312, 314 in the fluid 310, and a sensitivity of the signal to the presence of a bubble 312, 314 in the fluid 310.

An efficiency of the signal is calculated by the controller 200 according to the following equation:

$$\text{Efficiency} = 20\log_{10}\left(\frac{V_{in}}{V_{NoBubble}}\right) \quad \text{(Equation 1)}$$

where $V_{in}$ is the input voltage 232 and $V_{NoBubble}$ is the output voltage 242 independent of an influence of a bubble 312, 314 in the fluid 310; i.e. the output voltage 242 without the drop 244 shown in FIG. 7. The efficiency of the signal is calculated based on a ratio of the input voltage 232 to the output voltage 242 in the absence of a bubble 312, 314; the efficiency of the signal represents how much of the emitted signal is received by the receiver 150 through the fluid 310 in the absence of bubbles 312, 314.

A sensitivity of the signal is calculated by the controller 200 according to the following equation:

$$\text{Sensitivity} = 20\log_{10}\left(\frac{V_{Bubble}}{V_{NoBubble}}\right) \quad \text{(Equation 2)}$$

where $V_{bubble}$ is the output voltage 242 with the drop 244 indicating the presence of a bubble 312, 314 and $V_{NoBubble}$ is the output voltage 242 without the drop 244. The sensitivity of the signal is calculated based on a difference in an amplitude of the signal received by the receiver 150 between the absence of a bubble 312, 314 in the fluid 310 and the presence of the bubble 312, 314 in the fluid 310. The sensitivity indicates a change in the magnitude of the output voltage 242 in the presence of a bubble 312, 314.

The rotation offset angle A of the sensor axis S, shown in FIGS. 2 and 4-6, is set to optimize a ratio of the sensitivity of the signal received by the receiver 150 to the efficiency of the signal received by the receiver 150. The rotation offset angle A is selected to optimize a figure of merit according to the equation:

$$\text{Figure of Merit} = \left|\frac{20\log_{10}\left(\frac{Vbubble}{Vnobubble}\right)}{20\log_{10}\left(\frac{Vin}{Vnobubble}\right)}\right| \quad \text{(Equation 3)}$$

Figure 8:
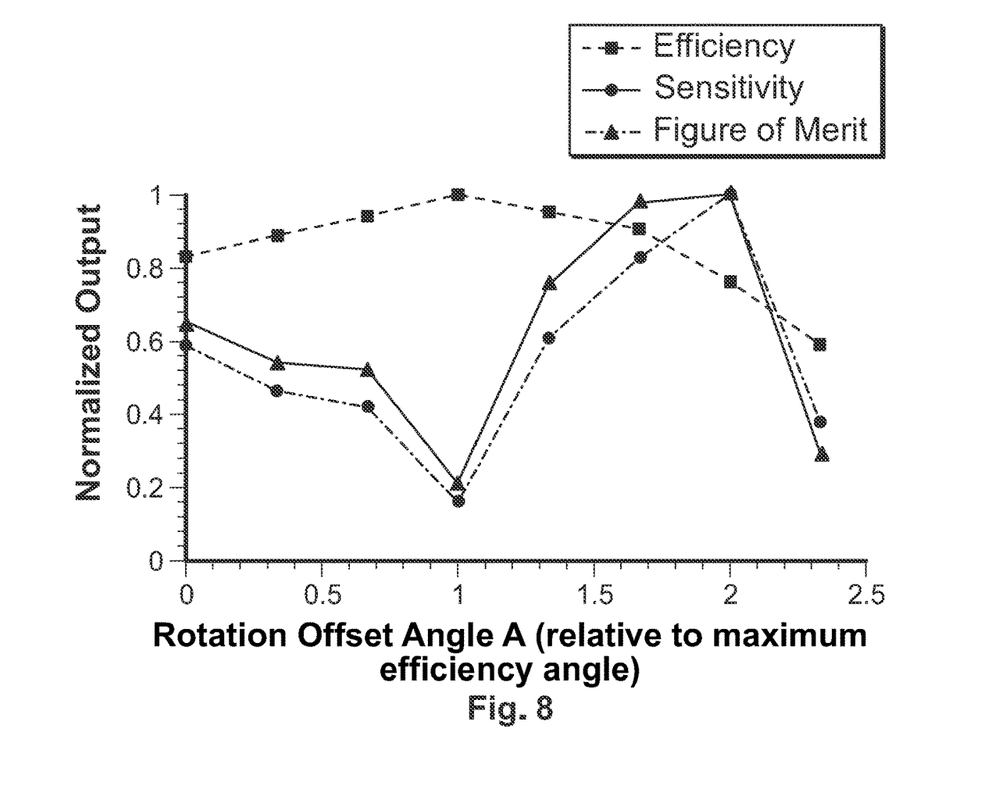
FIG. 8 is a graph of an efficiency, a sensitivity, and a figure of merit of the bubble detection system over a range of rotation offset angles.

The figure of merit is shown plotted in FIG. 8 separate from the efficiency and sensitivity over a range of rotation offset angles A. The rotation offset angle A on the x-axis of the graph is shown relative to the rotation offset angle A at maximum efficiency; i.e. as shown in FIG. 8, the x-axis value of the rotation offset angle A is 1 at maximum efficiency.

As shown in FIG. 8, selecting a rotation offset angle A of the sensor axis S according to the figure of merit, maximizing a ratio of sensitivity to efficiency, results in a rotation offset angle A that is greater than an angle set to optimize only the efficiency of the signal received by the receiver 150. The rotation offset angle A selected according to the figure or merit is nearly twice the angle selected for maximum efficiency in the embodiment shown in FIG. 8. In other embodiments, the rotation offset angle A is 1.6-2.1 times the angle selected for maximum efficiency.

The particular angle selected for the rotation offset angle A maximizing a ratio of sensitivity to efficiency according to the present invention will vary in different applications according to the particular specifications and dimensions of the housing 110, the emitter 130, the receiver 150, and the fluid conduit 130, among other variables. In an embodiment, the rotation offset angle A is greater than or equal to 20° and less than or equal to 35°. In such an embodiment, an angle selected only for maximum efficiency is approximately 15°. In another embodiment, the rotation offset angle A is greater than or equal to 25° and less than or equal to 30°.

By setting the rotation offset angle A to maximize a ratio of sensitivity to efficiency, the bubble detection sensor 100 of the bubble detection system 10 has an increased sensitivity to small bubbles 314 with a minimal impact on efficiency. The rotation offset angle A allows the detection of small bubbles 314 and large bubbles 314, such as in critical medical or other applications, without requiring more expensive signal processing or additional amplification.

What is claimed is:

1. A bubble detection sensor, comprising:
an emitter having an emitting surface; and
a receiver positioned on a side of a fluid conduit opposite the emitter, the receiver having a receiving surface adapted to receive a signal emitted by the emitter through a fluid of the fluid conduit, a sensor axis extending normal to the emitting surface and the receiving surface is disposed at a rotation offset angle with respect to a plane extending normal to a longitudinal conduit axis of the fluid conduit, the rotation offset angle is set to optimize a ratio of a sensitivity of the signal received by the receiver to an efficiency of the signal received by the receiver.

2. The bubble detection sensor of claim 1, wherein the sensitivity of the signal is calculated based on a difference in an amplitude of the signal received by the receiver between the absence of a bubble in the fluid and the presence of the bubble in the fluid.

3. The bubble detection sensor of claim 1, wherein the efficiency of the signal is calculated based on a ratio of an input voltage input to the emitter to an output voltage output by the receiver independent of an influence of a bubble in the fluid.

4. The bubble detection sensor of claim 1, wherein the rotation offset angle is selected to optimize a figure of merit according to an equation:

$$\text{Figure of Merit} = \left| \frac{\left| 20\log_{10}\left(\frac{Vbubble}{Vnobubble}\right) \right|}{\left| 20\log_{10}\left(\frac{Vin}{Vnobubble}\right) \right|} \right|$$

where Vin is an input voltage input to the emitter, Vbubble is an output voltage output by the receiver in the presence of a bubble in the fluid, and Vnobubble is the output voltage in the absence of the bubble in the fluid.

5. The bubble detection sensor of claim 1, wherein the rotation offset angle is greater than an angle of the sensor axis set to optimize only the efficiency of the signal received by the receiver.

6. The bubble detection sensor of claim 1, wherein the rotation offset angle is greater than or equal to 20° and less than or equal to 35°.

7. The bubble detection sensor of claim 6, wherein the rotation offset angle is greater than or equal to 25° and less than or equal to 30°.

8. The bubble detection sensor of claim 1, wherein the receiving surface is parallel to the emitting surface.

9. The bubble detection sensor of claim 1, wherein an emitting overlapping portion of the emitting surface overlaps with a receiving overlapping portion of the receiving surface in a direction extending parallel to the sensor axis.

10. The bubble detection sensor of claim 9, wherein the emitting overlapping portion of the emitting surface is greater than 0% and less than or equal to 50% of the emitting surface, and the receiving overlapping portion of the receiving surface is greater than 0% and less than or equal to 50% of the receiving surface.

11. The bubble detection sensor of claim 1, wherein the emitting surface does not overlap with the receiving surface in a direction extending parallel to the sensor axis.

12. The bubble detection sensor of claim 1, wherein the emitter has an emitter cross-sectional area and the receiver has a receiver cross-sectional area different from the emitter cross-sectional area.

13. The bubble detection sensor of claim 1, wherein the emitter and the receiver are each a piezoelectric crystal.

14. The bubble detection sensor of claim 1, further comprising another emitter and another receiver, the another emitter and the another receiver positioned with respect to each other identically to the emitter and the receiver.

15. The bubble detection sensor of claim 1, further comprising a housing having a first receiving section in which the emitter is held and a second receiving section in which the receiver is held.

16. The bubble detection sensor of claim 15, wherein the first receiving section is separated from the second receiving section along a depth direction perpendicular to the longitudinal conduit axis to form a channel between the first receiving section and the second receiving section.

17. The bubble detection sensor of claim 16, wherein the channel is formed by an exterior surface of the housing and the fluid conduit is disposed in the channel.

18. A bubble detection system, comprising:
a fluid conduit along which a fluid passes; and
a bubble detection sensor including an emitter having an emitting surface and a receiver positioned on a side of the fluid conduit opposite the emitter, the receiver having a receiving surface adapted to receive a signal emitted by the emitter through the fluid, a sensor axis extending normal to the emitting surface and the receiving surface is disposed at a rotation offset angle with respect to a plane extending normal to a longitudinal conduit axis of the fluid conduit, the rotation offset angle is set to optimize a ratio of a sensitivity of the signal received by the receiver to an efficiency of the signal received by the receiver.

19. The bubble detection system of claim 18, further comprising a controller providing an input voltage to the emitter to create the signal and receiving an output voltage from the receiver representative of the signal received by the receiver.

20. The bubble detection system of claim 19, wherein the controller determines a presence of a bubble in the fluid based on the output voltage.

\* \* \* \* \*